United States Patent
Freeland

[11] Patent Number: 5,551,505
[45] Date of Patent: Sep. 3, 1996

[54] HEAT EXCHANGER INLET DUCT WITH A CENTER BAFFLE

[75] Inventor: Mark Freeland, Farmington Hills, Mich.

[73] Assignee: Ford Motor Company, Dearborn, Mich.

[21] Appl. No.: 316,768

[22] Filed: Oct. 3, 1994

[51] Int. Cl.$^6$ .................................................. F28F 9/00
[52] U.S. Cl. ........................... 165/41; 165/903; 180/68.1
[58] Field of Search ............................. 165/41, 100, 903, 165/122; 180/68.1

[56] References Cited

U.S. PATENT DOCUMENTS

| | | | |
|---|---|---|---|
| 3,374,831 | 3/1968 | Sieverding | 165/122 |
| 3,874,191 | 4/1975 | Hudson | 165/122 |
| 3,993,136 | 1/1976 | Burst | 180/68.1 |
| 4,136,735 | 1/1979 | Beck et al. | 165/125 |
| 4,712,611 | 12/1987 | Witzel | 165/122 |
| 4,938,303 | 7/1990 | Schaal et al. | 180/68.1 |
| 4,971,143 | 11/1990 | Hogan | 165/122 |
| 4,995,447 | 2/1991 | Weidmann et al. | 165/44 |
| 5,136,046 | 8/1992 | Becquerel et al. | 165/122 |
| 5,193,608 | 3/1993 | Sekine | 165/41 |
| 5,219,016 | 6/1993 | Bolton et al. | 165/41 |

FOREIGN PATENT DOCUMENTS 4112811 10/1992 Germany .................................. 165/44

*Primary Examiner*—F. Daniel Lopez
*Assistant Examiner*—Mark Sgantzos
*Attorney, Agent, or Firm*—Roger L. May; Raymond L. Coppiellie

[57] ABSTRACT

An air inlet duct is provided for a heat exchanger of a vehicle. The heat exchanger having a top portion and a bottom portion for receiving air from an air inlet duct. The duct has an outer wall that fits against the heat exchanger and a center baffle for dividing air flow equally to the top and bottom portions of the heat exchanger. The center baffle has at least one member with a vertical portion dividing the air inlet into a plurality of vertical sections and at least one horizontal portion combining alternate ones of the vertical sections and directing air flowing therethrough to the top portion of the heat exchanger and also combining other alternate ones of the vertical sections and directing air flowing therethrough to the bottom portion of the heat exchanger so that the top and bottom portions receive substantially equal air flow.

18 Claims, 5 Drawing Sheets

HEAT EXCHANGER INLET DUCT WITH A CENTER BAFFLE

FIELD OF THE INVENTION

The present invention relates to a heat exchanger inlet duct, particularly an air inlet duct for a radiator of a vehicle.

BACKGROUND OF THE INVENTION

It is desirable to regulate the operating temperatures of the engine and other heat generating components in a automobile or other vehicle. A heat exchanger is used to help regulate the operating temperatures by removing heat. Heat is removed by forcing air across the heat exchanger using a fan when the vehicle is stationary and using ram air when the vehicle is moving. The ram air is typically funneled to the heat exchanger via an air duct. In older vehicles, the duct system utilized an open mesh front grill structure through which air passed directly to the heat exchanger. In modem vehicles, however, an open front grill structure for ram air is deminimus or nonexistent because of aerodynamic and aesthetic design considerations. As a result, the opening for the air inlet duct is located behind the front bumper of the vehicle.

The exact position of the inlet to the duct varies from vehicle to vehicle and also varies within a vehicle family depending upon the bumper and accessories used. At the inlet, air velocity varies dramatically in the vertical direction because of the exterior shape of the vehicle and because of the position of the inlet opening, but is more nearly constant in the horizontal direction. This gives rise to a much larger volume flow rate entering the lower part of the inlet opening which biases the air flow toward the lower portion of the heat exchanger. It is possible for two thirds of the air flow to flow to the bottom one third of the heat exchanger leaving only one third of the air flow for the top two thirds of the heat exchanger which is inefficient and undesirable. This air distribution causes uneven cooling in a typical heat exchanger wherein the coolant travels horizontally. Accordingly, it will be appreciated that it would be highly desirable to have an air inlet duct that evenly distributes air flow to the both the top and bottom portions of the heat exchanger for efficient and effective cooling. It is also desirable to have an air inlet duct that evenly divides air flow regardless of the exterior shape of the vehicle or position or configuration of the front bumper.

SUMMARY OF THE INVENTION

The present invention is directed to overcoming one or more of the problems set forth above. Briefly summarized, according to one aspect of the present invention, an air inlet duct comprises a center baffle having at least one baffle member with a vertical portion dividing the duct into a plurality of vertical sections and at least one horizontal portion combining alternate ones of the vertical sections and directing air flowing therethrough horizontally at a first elevation and also combining other alternate ones of the vertical sections and directing air flowing therethrough horizontally at a second elevation so that there is substantially equal air flow at the first and second elevations.

There are preferably a plurality of baffle members with their vertical portions forming walls with adjacent walls joined alternately by a first horizontal wall at their tops and by a second horizontal wall at their bottoms. The joining of the walls gives the center baffle a castellated appearance. Adjacent vertical walls and a joining first or second horizontal wall form a rectangular cross-section at an entrance to the air inlet duct that changes to a horizontal straight line in the duct forming the horizontal portion of the baffle. The rectangular cross-section blends into a triangular cross section in the duct before changing to the horizontal straight line. Entering air is divided into vertical columns and blended into two or more horizontal streams. Half of the multiple vertical columns are blended into a single upper horizontal stream while the other half of the multiple vertical columns are blended into a single lower horizontal stream.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
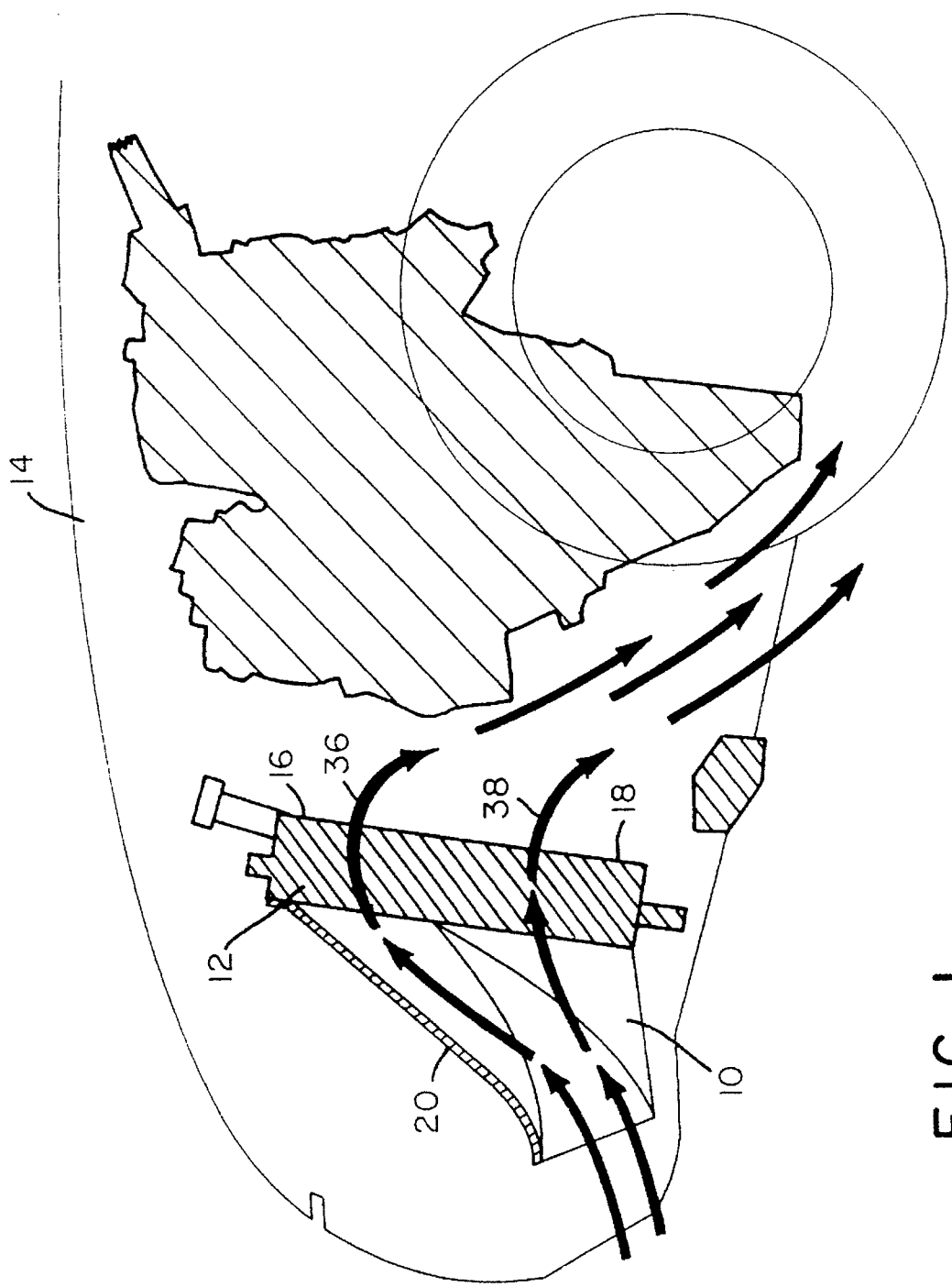
FIG. 1 is a diagrammatic side view of a front end portion of a vehicle with a portion removed to reveal a preferred embodiment of a an air inlet duct for delivering air to a heat exchanger according to the present invention.

Referring to FIG. 1, an air inlet duct 10 is provided for a heat exchanger 12 of a vehicle 14. The heat exchanger 12 is mounted in the front end of the vehicle 14 forward of the engine and may have fluid carrying tubes connecting it to the engine, air conditioning system and transmission for temperature control. The heat exchanger may be a single unit or may be formed of several units with each unit cooling a specific component or system. The heat exchanger 12 may be equipped with a fan to force air to circulate when the vehicle is stationary or moving at a low speed. The heat exchanger 12 has a top portion 16 and a bottom portion 18 and will typically have fluid flowing therethrough horizontally from one side to the other side, although in some applications the fluid may flow vertically.

Figure 2:
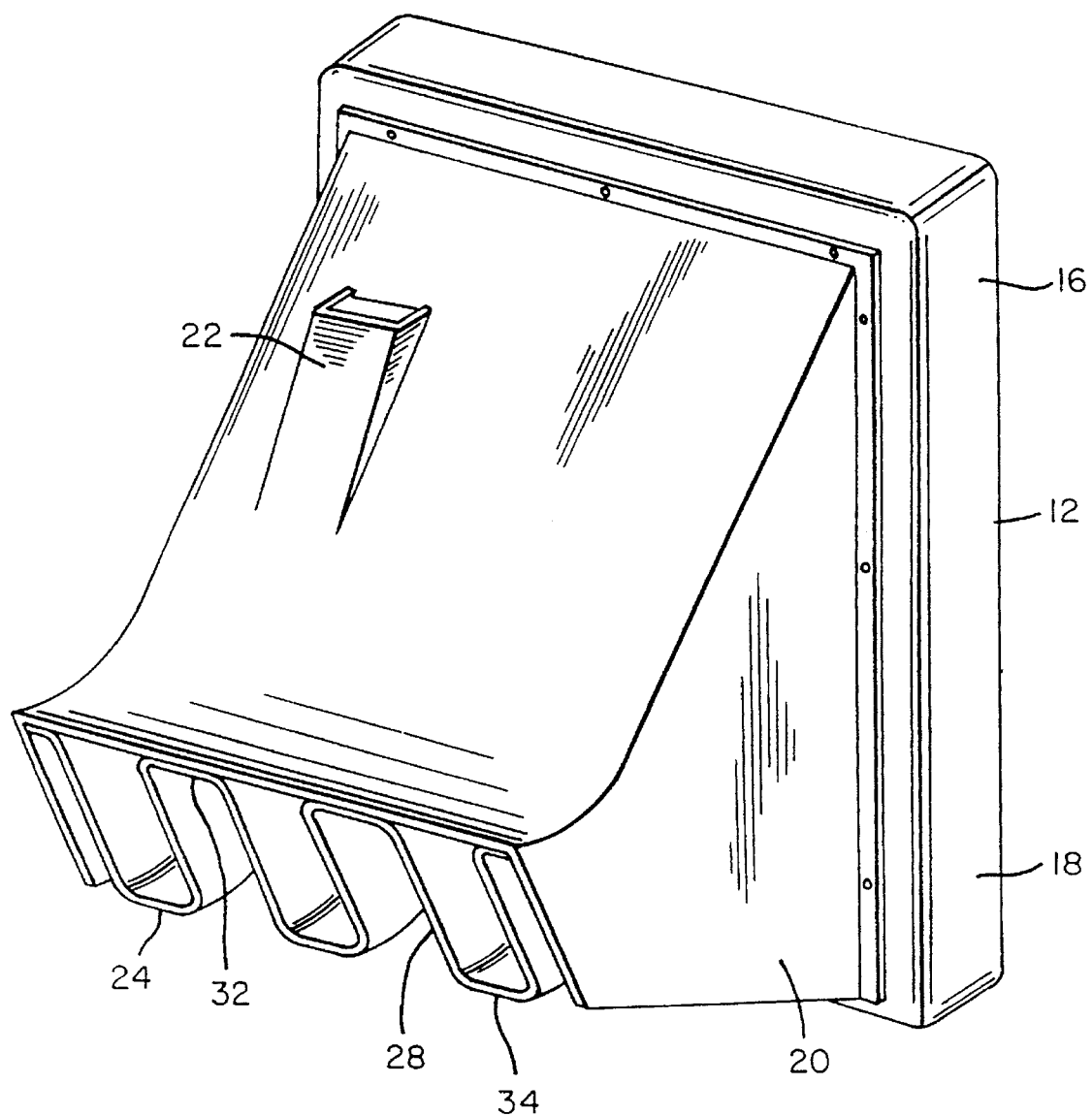
FIG. 2 is a perspective view of the air inlet duct of FIG. 1 attached to the heat exchanger.
Figure 3:
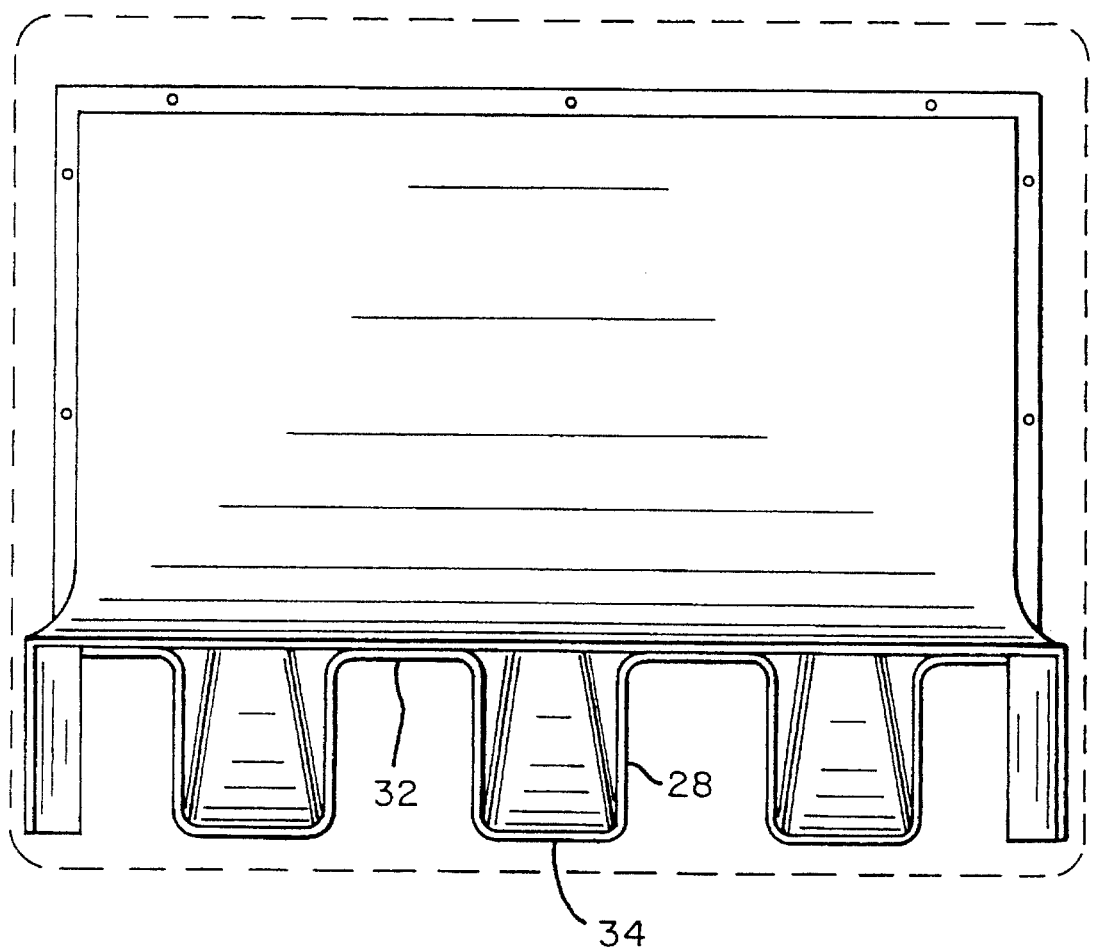
FIG. 3 is a front view of the air inlet duct of FIGS. 1–2 illustrating the mounting flanges and air inlet opening.
Figure 4:
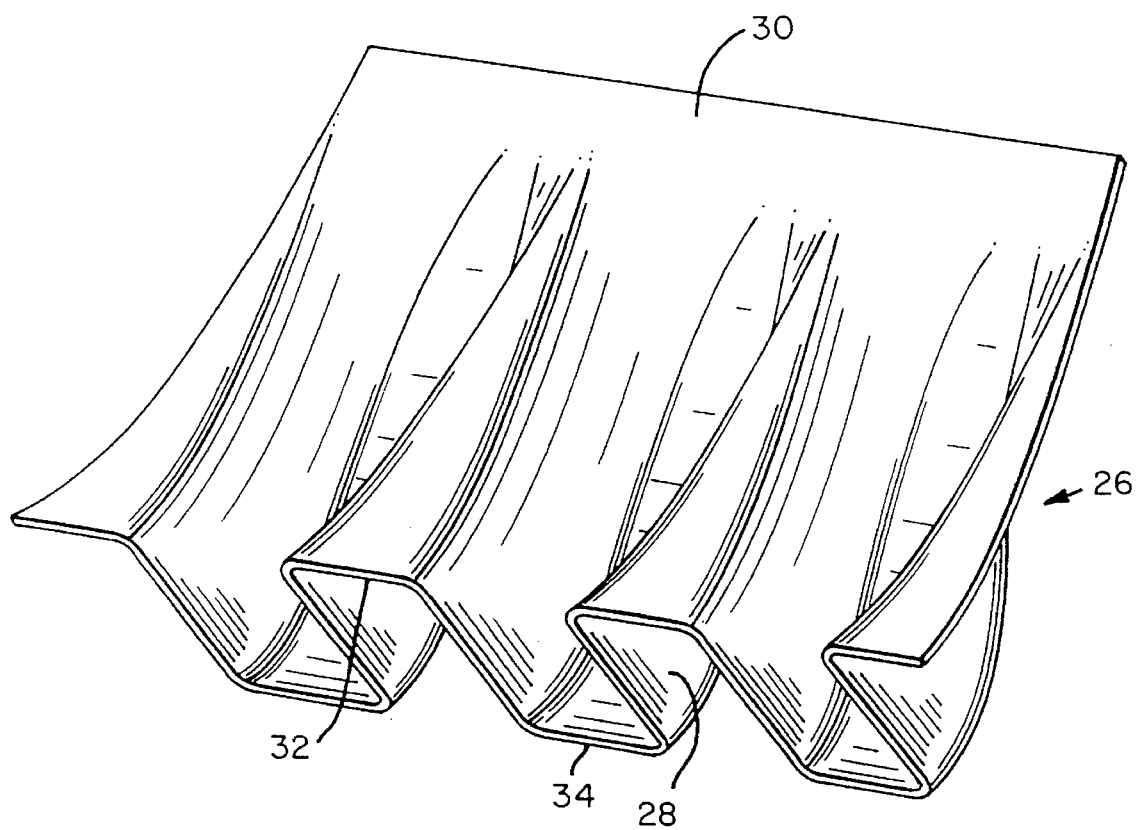
FIG. 4 is a perspective view of the center baffle of the air inlet duct of FIGS. 1–3.

Referring to FIGS. 2–4, the air inlet duct 10 has an outer wall 20 forming a duct for receiving air and delivering air to the heat exchanger 12. The outer wall is preferably a four sided wall but may have only three sides with an open bottom. The outer wall 20 may also form a secondary duct 22 for providing cooling air to other components or providing combustion air for the engine. A center baffle 24 is positioned inside the outer wall 20. The center baffle 24 has at least one baffle member 26 with a vertical portion 28 dividing the duct into a plurality of vertical sections. The baffle member 26 has a horizontal portion 30 that combines alternate ones of the vertical sections and directs air flowing therethrough to the top portion 16 of the heat exchanger 12 as indicated by arrows 36, and also combines the other alternate ones of the vertical sections and directs air flowing therethrough to the bottom portion 18 of the heat exchanger 12 as indicated by arrows 38. By this construction, the top and bottom portions 16, 18 of the heat exchanger 12 receive substantially equal air flow.

Preferably, there are a plurality of baffle members 26 with their vertical portions 28 forming inclined walls, preferably substantially vertical, with adjacent vertical walls joined alternately by a first horizontal wall 32 at their tops and joined by a second horizontal wall 34 at their bottoms. This gives the center baffle 24 a castellated appearance wherein adjacent vertical walls and adjoining first or second horizontal walls form a substantially rectangular cross-section at the entrance to the air inlet duct. The rectangular cross-section changes to a horizontal straight line in the duct forming the horizontal portion 30 of the baffle 24. The rectangular cross-section blends into a substantially triangular cross-section in the duct before changing to the horizontal straight line. By this construction the stream of air changes from a rectangular cross-section to a triangular cross-section and is flattened to a rectangle whose long sides extend horizontally.

Figure 5:
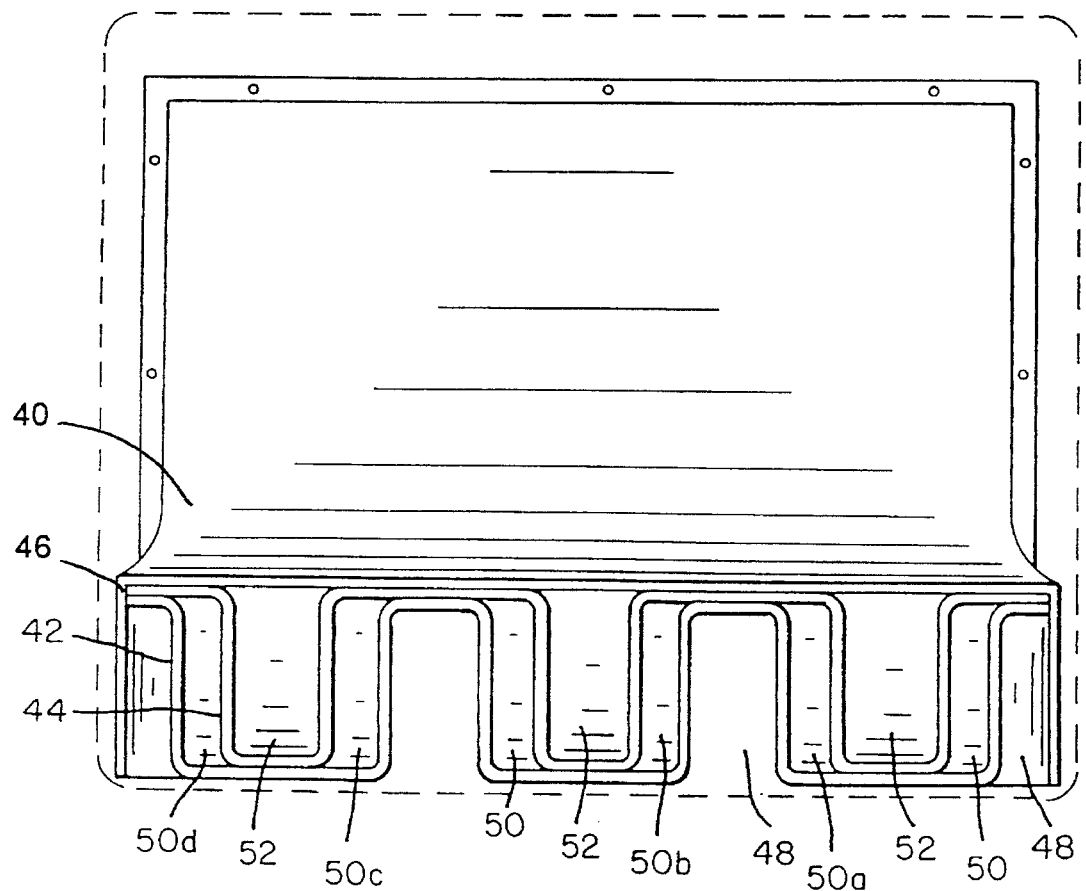
FIG. 5 is a font view similar to FIG. 3, but illustrating another preferred embodiment.

Referring to FIG. 5, an air inlet duct 40 has lower and upper baffle members 42, 44 positioned inside an outer wall 46. The baffles 42, 44 are nested forming multiple vertical sections arranged in a repeating series of lower, middle and upper vertical sections 48, 50, 52 for respectively directing air to the lower, middle and upper portions of the heat exchanger. As illustrated, for each lower vertical section 48, there is an upper vertical section 52 and two middle vertical sections 50 that together approximately equal the area of the upper and lower sections 52, 48. Because of the nesting arrangement, alternate middle vertical sections 50 are divided into two portions 50a, 50b by a lower vertical section 48, and each of the other alternate middle vertical sections is divided into two portions 50c, 50d by an upper vertical section 52. Other nesting arrangements are possible that will vertically divide the incoming air flow and blend it into three or more substantially equal horizontal streams, but the embodiment illustrated is preferred because of its simplicity.

Operation of the present invention is believed to be apparent from the foregoing description and drawings, but a few words will be added for emphasis. Where there is a single center baffle, a single stream of air entering the rectangular opening of the duct is vertically divided and blended into two horizontal streams. Half of the multiple vertical columns are blended into a single horizontal stream below the baffle for cooling the bottom portion of the heat exchanger while the other half of the multiple vertical columns are blended into a single horizontal stream above the baffle for cooling the top portion of the heat exchanger. Where there are multiple baffles, a single stream of air entering the rectangular opening of the duct is vertically divided and blended into three horizontal streams. One third of the multiple vertical columns are blended into a lower horizontal stream below the baffles for cooling the lower portion of the heat exchanger, one third of the multiple vertical columns are blended into a middle horizontal stream above the lower baffle but below the upper baffle for cooling the middle portion of the heat exchanger, and one third of the multiple vertical columns are blended into an upper horizontal stream above the upper baffle for cooling the upper portion of the heat exchanger.

It can now be appreciated that there has been presented an air inlet duct with a center baffle that divides incoming air vertically into rectangular columns at the duct opening and alternately diverts the rectangular columns to the top and bottom sections of the heat exchanger so that the top and bottom portions of the heat exchanger receiver substantially equal air flow. This is an improvement over previous air ducts wherein the inlet opening in the front of the vehicle was biased toward the bottom portion of the heat exchanger resulting in the top portion of the heat exchanger starving for air flow. The center baffle of the present invention equalizes air flow to the top and bottom portions of the heat exchanger irrespective of their positions relative to the duct opening. Further, the air distribution to the heat exchanger is not affected by the exterior styling of the vehicle because the center baffle divides incoming air into vertical columns, then alternately combines the vertical columns into horizontal streams directed to the top and bottom portions of the heat exchanger. Where desired, a plurality of baffle members may be used to divide the incoming air into vertical columns and alternately combine the vertical columns into several horizontal streams directed to selected portions of the heat exchanger.

The reason for the castellated center baffle is that air velocity, which is more nearly constant in the horizontal direction, varies greatly in the vertical direction because of the exterior shape of the vehicle and the position of the duct opening. This gives rise to a much larger volume flow rate entering the lower pa of the duct which would bias air flow toward the bottom portion of the heat exchanger if the center baffle were absent. In the past, roughly two thirds of the air flow was to the bottom one third of the heat exchanger leaving only one third of the air flow for the top two thirds of the heat exchanger. Consequently, the top portion of the heat exchanger did not transfer much heat. The present invention uses a duct with a center baffle to divert an equal amount of the inlet air to the top and bottom portions of the heat exchanger to effect equal cooling. Because of the center baffle, the efficient utilization of the available air and heat exchanger area increases the total potential heat rejection of a heat exchanger or allows use of a smaller heat exchanger to reject a given amount of heat.

While the invention has been described with particular reference to an automobile, it is apparent that the heat exchanger inlet duct with a center baffle is easily adapted to other vehicles. As is evident from the foregoing description, certain aspects of the invention are not limited to the particular details of the examples illustrated, and it is therefore contemplated that other modifications and applications will occur to those skilled in the art. For example, where an air plenum exists, the center baffle may be used without the outer wall. Also, the present invention is not restricted to air-to-fluid heat exchanger inlet ducts. It can equally be used to divide liquid streams into substantially equal portions. It is accordingly intended that the claims shall cover all such modifications and applications as do not depart from the true spirit and scope of the invention.

What is claimed is:

1. An air inlet duct for a heat exchanger, comprising:
a first baffle having at least one member with a vertical portion dividing said air inlet into a plurality of vertical sections and at least one horizontal portion combining alternate ones of said vertical sections and directing air flowing therethrough to a first selected portion of said heat exchanger and also combining other alternate ones of said vertical sections and directing air flowing therethrough to a second selected portion of said heat exchanger so that said first and second selected portions receive substantially equal air flow.

2. An air inlet duct, as set forth in claim 1, including
a second baffle positioned above said center baffle, said second baffle having at least one member with a vertical portion dividing said air inlet into a plurality of vertical sections and at least one horizontal portion combining alternate ones of said vertical sections and directing air flowing therethrough to a third selected portion of said heat exchanger and also combining other alternate ones of said vertical sections and directing air flowing therethrough to said second selected portion of said heat exchanger so that said first, second and third selected portions receive substantially equal air flow.

3. An air inlet duct, as set fourth in claim 1, including an outer wall forming a duct for receiving air and delivering air to said heat exchanger, said first baffle being positioned in said duct formed by said outer wall.

4. An air inlet duct, as set forth in claim 3, wherein said outer wall has three sides and an open bottom.

5. An air inlet duct for a heat exchanger, said heat exchanger having a top portion and a bottom portion, said air inlet duct comprising:

an outer wall forming a duct for receiving air and delivering said to said heat exchanger; and a center baffle positioned inside said outer wall and having at least one baffle member with a vertical portion dividing said duct into a plurality of vertical sections and at least one horizontal portion combining alternate ones of said vertical sections and directing air flowing therethrough to said top portion of said heat exchanger and also combining other alternate ones of said vertical sections and directing air flowing therethrough to said bottom portion of said heat exchanger so that said top and bottom portions receive substantially equal air flow.

6. An air inlet duct, as set forth in claim 5, wherein there are a plurality of baffle members with their vertical portions forming substantially vertical walls with adjacent vertical walls joined alternately by a first horizontal wall at their tops and by a second horizontal wall at their bottoms.

7. An air inlet duct, as set forth in claim 6, wherein adjacent vertical walls and an adjoining second horizontal wall form a substantially rectangular cross section at an entrance to said air inlet duct that changes to a horizontal straight line in said duct forming said horizontal portion of said baffle.

8. An air inlet duct, as set forth in claim 7, wherein said rectangular cross section blends into a substantially triangular cross section in said duct before changing to said horizontal straight line.

9. An air inlet duct, as set forth in claim 6, wherein said center baffle has a castellated appearance.

10. An air inlet duct, as set forth in claim 6, wherein adjacent vertical walls and an adjoining first horizontal wall form a substantially rectangular cross section at an entrance to said air inlet duct that changes to a horizontal straight line in said duct forming said horizontal portion of said baffle.

11. An air inlet duct, as set forth in claim 10, wherein said rectangular cross section blends into a substantially triangular cross section in said duct before changing to said horizontal straight line.

12. An air inlet duct comprising:

an outer wall forming a duct for receiving air and delivering air; and a center baffle positioned inside said outer wall and having at least one baffle member with a vertical portion dividing said duct into a plurality of vertical sections and at least one horizontal portion combining alternate ones of said vertical sections and directing air flowing therethrough horizontally at a first elevation and also combining other alternate ones of said vertical sections and directing air flowing therethrough horizontally at a second elevation so that there is substantially equal air flow at said first and second elevations.

13. An air inlet duct, as set forth in claim 12, wherein there are a plurality of baffle members with their vertical portions forming substantially vertical walls with adjacent vertical walls joined alternately by a first horizontal wall at their tops and by a second horizontal wall at their bottoms.

14. An air inlet duct, as set forth in claim 13, wherein adjacent vertical walls and an adjoining second horizontal wall form a rectangular cross section at an entrance to said air inlet duct that changes to a horizontal straight line in said duct forming said horizontal portion of said baffle.

15. An air inlet duct, as set forth in claim 14, wherein said rectangular cross section blends into a triangular cross section in said duct before changing to said horizontal straight line.

16. An air inlet duct, as set forth in claim 13, wherein said center baffle has a castellated appearance.

17. An air inlet duct, as set forth in claim 13, wherein adjacent vertical walls and and an adjoining first horizontal wall form a rectangular cross section at an entrance to said air inlet duct that changes to a horizontal straight line in said duct forming said horizontal portion of said baffle.

18. An air inlet duct, as set forth in claim 17, wherein said rectangular cross section blends into a triangular cross section in said duct before changing to said horizontal straight line.

* * * * *